United States Patent Office 3,409,560
Patented Nov. 5, 1968

3,409,560
METAL OXIDE DISPERSIONS
Jacob Faust, Belleville, N.J., and Norman C. Ross, Franklin, Pa., assignors, by mesne assignments, to The Perolin Company, Inc., New York, N.Y., a corporation of Delaware
No Drawing. Filed Aug. 23, 1965, Ser. No. 481,906
10 Claims. (Cl. 252—309)

ABSTRACT OF THE DISCLOSURE

Stable, free-flowing metal oxide dispersions in water-in-oil emulsion medium comprising, based on the total weight of the dispersion, (A) about 25 to 50% of a metal oxide selected from the group consisting of hydrated aluminum and zinc oxide, having a particle size below about 1 micron, (B) about 8 to 18 total of (i) about 4 to 10% high molecular weight petroleum sulfonates having a molecular weight of between about 480 and 520, and (ii) from about 3 to 8% low molecular weight petroleum sulfonates having a molecular weight between about 400 and 440, wherein the ratio of high molecular weight to low molecular weight petroleum sulfonates ranges from about 0.75:1 to 2.25:1, (C) about 8 to 18% of water; and (D) about 14 to 59% of a hydrocarbon oil having a viscosity between about 30 and 150 S.U.S. at 100° F.

---

Dispersions and colloidal solutions of metal oxides such as aluminum oxide and zinc oxide have in recent times found numerous applications in industry, for example as fuel oil additives, in paints and ink.

It would be highly desirable for many industrial applications to provide metal oxides in a form that can be added to and readily dispersed in an oil based medium. For example, the use of certain metal oxides as additives for various fuel oils to protect combustion chambers and boilers from corrosion and slagging is well known and amply described in the literature. A stable, free flowing additive having a high metal oxide content in a very fine state of subdivision that may be added directly to the fuel oil and will readily disperse therein and will not settle out on standing is highly desirable as it would be for many other industrial applications.

It is an object of the present invention to provide novel compositions comprising a stable dispersion having a high content of metallic oxides.

It is another object of the present invention to provide novel free flowing, stable dispersions of metal oxides such as hydrated alumina and zinc oxide that have a high content of the metal oxide and can be readily dispersed in an oil medium.

It is another object of the present invention to provide the methods for making novel free flowing stable dispersions of metal oxides such as hydrated alumina and zinc oxide.

It is still another object of the present invention to provide novel, free flowing, stable water-in-oil dispersions of metal oxides such as hydrated alumina and zinc oxide that can be used as a fuel oil additive to reduce corrosion and slagging problems in combustion chambers and boilers.

In accordance with the present invention, it has been discovered that these desiderata and many other advantages and benefits are realized by novel free flowing water-in-oil emulsions having exceptional stability wherein metal oxides such as hydrated alumina and zinc oxide are uniformly dispersed in a very fine state of subdivision. The novel dispersions of our invention comprise, based on the total weight of the dispersion, about 25 to 50 percent of a metal oxide selected from the group consisting of hydrated alumina and zinc oxide, from about 8 to 18 percent of a mixture of high and low molecular weight petroleum sulfonates wherein the mixing ratios of the high to low molecular weight sulfonates are from about 0.75 to about 2.25; from about 8 to 18 percent of water; and from about 14 to 59 percent by weight of a hydrocarbon oil.

The hydrated alumina and zinc oxide particles suitable for use in the compositions of the present invention should be in the form of a finely divided powder, preferably in the form of particles of less than 1 micron diameter.

As the oil portion of the dispersion, we prefer to use an oil having a viscosity of between 30–150 S.U.S. at 100° F. in order to impart fluidity to the product as well as to simplify the preparation of the water-in-oil emulsion. Such oils may be conventional refined or semi-refined mineral oils, either acid treated, clay treated, solvent refined, hydrogenated or even pale oils. Naphthenic-type oils having a viscosity of 40–100 S.U.S. at 100° F. are well suited for preparing such stable dispersions of the type herein described. Also suitable are mixed naphthenic-paraffinic and paraffinic oils. Similarly, light hydrocarbon oils such as kerosene, heavy oils such as lubricating oil or distillates or residual fuel oils such as Bunker C fuel oil can be employed to obtain stable dispersions as described herein.

The petroleum sulfonates used as dispersing and emulsifying agents in the compositions of our invention may be materials having both hydrophilic and hydrophobic groups and include alkyl, aryl or alkaryl sulfonates. Among such materials which are suitable for use in the compositions of our invention are petroleum mahogany sulfonates such as sodium, calcium, barium, magnesium, and lithium petroleum sulfonates, as for example the oil soluble mahogany salts of aromatic sulfonic acids derived from petroleum and hydrocarbon oils. Many of the aromatic sulfonates have cycloalkyl chains (i.e., naphthenic groups in the side chains attached to the benzene ring). The mahogany soaps may include non-aromatic sulfonates produced in conventional sulfuric acid refining of lubricating oil distillates and from the industrial use of fuming sulfuric acid and sulfur trioxide in the refining of petroleum. The industrial production of oil-soluble mahogany sulfonates from petroleum is well understood in the art and is described in the literature. Normally, the alkyl sulfonates require about 24 carbon atoms for good oil solubility. The alkaryl sulfonates, however, require an alkyl portion totaling only about 18 carbon atoms. To attain the requisite oil solubility, therefore, generally calls for the hydrocarbon from which the sulfonate is prepared to have a molecular weight between 300 and 800, but, preferably, this molecular weight is between 310 and 500. Besides the mahogany soaps derived from petroleum refining, one can employ salts of diwaxbenzene sulfonic acids and polydodecylbenzene sulfonic acids such as the sodium, barium, calcium, magnesium or lithium diwaxbenzene sulfonates. The wax, paraffin or microcrystalline, used in making the wax aromatic sulfonates is obtained from different sources of crude petroleum oil, and the process of preparing diwaxaromatic sulfonic acids is well understood in the art and is described in the literature.

Other sulfonates which may be used in the process of this invention include, for example, the foregoing salts of mono- and poly-wax sulfonic acids, diphenyl amine sulfonic acids, dilauryl betanaphthol sulfonic acids, unsaturated paraffin wax sulfonic acids prepared by the sulfonation of unsaturated paraffin wax that has been prepared by the dehydrochlorination of chloro-wax which in turn may be obtained by chlorinating paraffin wax, hydroxy substituted paraffin wax sulfonic acids, tetra-amylene sulfonic acids, mono- and poly-chlorosubstituted paraffin sulfonic acids, paraffin wax sulfonic acids, nitroso-paraffin wax sulfonic acids; cycloaliphatic sulfonic acids such as laurylcyclo-hexyl sulfonic acids and mono- and poly-wax substituted cyclo-hexyl sulfonic acids.

Polydodecylbenzene sulfonic acids are prepared by sulfonating polydodecylbenzene, a product consisting of mono-alkyl benzene and di-alkyl benzenes in the approximate ratio of 2:3 which is obtained as a residue from the distillation of the reaction products of dodecene and excess benzene in the presence of a Friedel-Crafts catalyst.

The stability of the compositions of our invention depends, among other things, on the conjoint use of a blend of high and low molecular weight petroleum sulfonates, particularly sodium petroleum mahogany sulfonates. Illustrative of such high molecular weight sulfonates are those having a molecular weight of from about 480 to about 520 and preferably about 490 to 510. Illustrative of such low molecular weight sulfonates are those having a molecular weight of from about 400 to 440 and preferably from about 410 to 430.

The amount of high molecular weight sulfonate in the dispersion may range between 4 and 10 percent and that of the low molecular weight sulfonate may range between 3 and 8 percent, said percentages being based on the weight of the total dispersion. Suitable ratios of the high to low molecular weight sulfonates range between 0.75 and 2.25. Especially suitable and preferred amounts of the total sulfonates range between 10 and 14 percent based on the weight of the total dispersion wherein the ratios of high to low molecular weight sulfonate range between 1.25 and 1.5.

The amount of oil in the emulsion may range between 14 and 59 percent, preferably between 20 and 53 percent and especially between 25 and 33 percent by weight, while water should be present within the range of 8 to 18 percent by weight and preferably between 12 and 16 percent by weight, said percentages being based on the weight of the entire formulation.

The high molecular weight and the low molecular weight petroleum sulfonates function conjointly to modify the properties and characteristics of the metal oxide dispersion so as to produce results and effects not attainable with each individually. Further, the use of water in the proportions stated in the compositions of the present invention and pursuant to the teaching of our invention functions importantly to modify the properties of said dispersions so as to obtain the unusual stability which is possessed by such dispersions.

The stable, free flowing metal oxide dispersions of the present invention have the appearance of a homogeneous emulsion, are fluid at ambient room temperature, dissolve readily in oil based media such as fuel oils, and do not separate out or form a deposit on storage even at temperatures as high as 175° F. or as low as −10° F. Microscopic examination reveals that the average size of particles in the emulsion is in the submicron range even though the particle sizes of the hydrated alumina or zinc oxide had particle sizes originally ranging up to 1 micron and somewhat larger.

Various supplemental materials can be incorporated into the metal oxide dispersions of our invention, provided that they do not materially adversely affect the desirable properties of dispersion and emulsion stability. Such supplemental materials include, for instance, auxiliary diluents and emulsifying agents such as, for example, phenols, glycerol, gylcols, sugars and alcohols; carbon black, inorganic pigments such as iron oxides and the like that are added to color the dispersion depending upon the application for the final product. Generally speaking, such pigments, where used, should be employed in amounts of at least 0.25 part by weight of the composition as a whole in order to obtain adequate intensity of coloration.

The following examples are illustrative of the practice of the present invention. They are not to be construed as in any way limitative of the scope of the invention since numerous other dispersions can readily be produced, and other uses developed, in the light of the teachings and guiding principles disclosed herein.

Example 1

This example illustrates a particularly advantageous method of preparing a free flowing metal oxide dispersion having exceptional stability.

7 weight parts of a sodium mahogany sulfonate having a molecular weight of 500 and 5 weight parts of a sodium mahogany sulfonate having a molecular weight of 420 were mixed together at a temperature between 150°–180° F. until the resulting blend was clear and uniform. To the blend of sulfonates were then added 28 weight parts of a paraffinic petroleum hydrocarbon oil having a 40 S.U.S. viscosity at 100° F. Mixing of the blend at a temperature of 150°–180° F. was carried out until a clear solution was obtained after which 45 weight parts of hydrated alumina having an average particle size of 0.1 micron was slowly added with mixing. A homogeneous, fluid dispersion was obtained after about 30 minutes during which time the batch was maintained at a temperature above 100° F.

To the dispersion were then added 15 weight parts of water and after vigorous mixing a free flowing, light colored, uniform water in oil emulsion was obtained.

The viscosity of the final dispersion as measured at 80° F. using a Ford cup (50 cc.) and Brookfield viscometer was found to be 50 seconds and 3000 cps., respectively.

Storage stability tests were run on samples of the dispersion at −10° F., 80° F., 100° F., 120° F., 150° F. and 175° F. and after 12 weeks and 6 months no settling or separation of the ingredients in the dispersion was observed.

Additional evidence of the stability of the dispersion was obtained by a centrifuge test. In this test four 100 gram samples of the dispersion were centrifuged for one hour at 80° F. and another four 100 gram samples were centrifuged at 150° F. The liquid portion was poured off from each sample and the residue that had separated from the liquid was washed with solvent to remove the oil and then weighed. The residue found in the 80° F. test ranged from 0.0 to 0.6% and at 150° F. from 1.0 to 1.2%, said percentages being based on the weight of the entire formulation.

To illustrate the effect of varying the sulfonate agent and water constituents in the composition, the following Examples 2 and 3 are included as illustrative. In each of them hydrated alumina having an average particle size of 0.1 micron was used. The high molecular weight agent (H) was a sodium mahogany sulfonate surface active agent having a molecular weight of 500 and the low molecular weight agent (L) was a sodium mahogany sulfonate surface active agent having a molecular weight of 420.

Example 2

To show the effect of varying the ratio of high to low (H/L) molecular weight sulfonates a series of tests was run using compositions having 45 weight parts of hydrated alumina, 15 weight parts of water, 12 weight parts of total surface active agent and 28 weight parts of paraffinic petroleum hydrocarbon oil of 40 S.U.S. viscosity at 100° F. The procedure of Example 1 was used in preparing the compositions of this Example 2. The centrifuge stability test described in Example 1 was used in this example. Typical results are shown in Table I.

TABLE I

| Parts by Weight | | Ratio (H/L) | Centrifuge Residue (percent by weight) at— | | Viscosity in seconds (Ford cup, 50 cc. at 80° F.) |
|---|---|---|---|---|---|
| H | L | | 80° F. | 150° F. | |
| 12.0 | | | 45.0 | 51.5 | 18.0 |
| 10.8 | 1.2 | 9.0 | 45.0 | 51.0 | 18.0 |
| 9.6 | 2.4 | 4.0 | 45.0 | 45.0 | 26.0 |
| 8.4 | 3.6 | 2.33 | 20.0 | 38.0 | 34.0 |
| 7.2 | 4.8 | 1.5 | 0.2 | 0.5 | 52.0 |
| 7.0 | 5.0 | 1.4 | 0.5 | 0.8 | 50.0 |
| 6.4 | 5.6 | 1.14 | 0.6 | 1.5 | 145.0 |
| 6.0 | 6.0 | 1.0 | 1.1 | 2.6 | 148.0 |
| 5.4 | 6.6 | 0.8 | 8.3 | 18.0 | 198.0 |
| 4.8 | 7.2 | 0.67 | | | Pasty |
| 2.4 | 9.6 | 0.25 | | | Paste |
| | 12.0 | | | | Paste |

The centrifuge residue values are used to evaluate the stability of the dispersions in the following manner: 0.0 to 0.5% represents perfect stability, or no precipitate found; 45.0% or higher represents total instability or all of the solids, including some of the sulfonates, precipitated out of the sample.

It will be seen, from Table I, that the dispersions using a combination of high and low molecular weight sulfonate surface active agents wherein the ratio of high to low sulfonates was in the range of 1.25 to 1.5 exhibited outstanding stability as well as being free-flowing whereas dispersions prepared using either of the surface active agents alone were either completely unstable or non-flowing.

Example 3

To show the effect of varying the amount of water in the oil-in-water emulsion a series of tests was run using compositions having 45 weight parts of the hydrated alumina of Example 1, 7.2 weight parts of the high molecular weight sulfonate of Example 1, 4.8 weight parts of the low molecular weight sulfonate of Example 1 and proportions of the hydrocarbon oil of Example 1 and water as noted below in Table II. The procedure of Example 1 was used in preparing the composition of this Example 3. The centrifuge stability test described in Example 1 was used in this example. Typical results are shown in Table II.

TABLE II

| Parts by Weight | | Centrifuge Residue at— | | Viscosity in Seconds (Ford cup, 50 cc. at 80° F.) |
|---|---|---|---|---|
| Water | Hydrocarbon Oil | 80° F. | 150° F. | |
| 6.0 | 37.0 | 45.0 | 45.0 | 18.0 |
| 8.0 | 35.0 | 25.0 | 45.0 | 22.0 |
| 10.0 | 33.0 | 20.0 | 35.0 | 24.0 |
| 11.0 | 32.0 | 10.0 | 20.0 | 27.0 |
| 12.0 | 31.0 | 1.5 | 2.0 | 36.0 |
| 13.0 | 30.0 | 1.0 | 1.5 | 36.0 |
| 14.0 | 29.0 | 0.5 | 0.6 | 42.0 |
| 15.0 | 28.0 | 0.2 | 0.5 | 50.0 |
| 16.0 | 27.0 | 0.6 | 0.8 | 55.0 |
| 17.0 | 26.0 | Some oil separation | | 69.0 |
| 18.0 | 25.0 | Oil separation | | 92.0 |
| 19.0 | 24.0 | Gellation and oil separation | | 132.0 |
| 20.0 | 23.0 | | | Paste |

Example 4

Following the procedure of Example 1 a zinc oxide dispersion was prepared in the proportions as described below:

| | Parts by wt. |
|---|---|
| Zinc oxide | 40.0 |
| H sulfonate | 5.0 |
| L sulfonate | 7.0 |
| Hydrocarbon oil | 36.0 |
| Water | 12.0 |

The zinc oxide used in this Example 4 had an average particle size of 0.1 micron; the H sulfonate used was a sodium mahogany sulfonate having a molecular weight of 510; the L sulfonate used was a sodium mahogany sulfonate having a molecular weight of 410; and the hydrocarbon oil of Example 1 was used herein.

Storage stability tests as described in Example 1 were run on samples of the zinc oxide dispersion and after 12 weeks and 6 months no settling or separation of the ingredients could be observed. Ford cup viscosity at 80° F. was 45 to 50 seconds.

The compositions of the present invention are stable, free-flowing dispersions which are readily miscible with commercially available residual fuel oils such as Bunker C fuel oil or No. 6 fuel oil. The components will not settle out even upon standing for extended periods, such as 1 year, for example.

The additive dispersion may be combined with such fuel oils in various proportions within the broad range of 0.01 to 20 parts per 100 parts of fuel oil or hydrocarbon material, with favorable results and with no evidence of settling out upon standing. Generally, it is uneconomical to employ more than 3 parts of additive per 100 parts of fuel oil. The amount of additive dispersion generally employed depends upon many factors such as the severity of conditions leading to corrosion or slagging, the amount of protection desired, and, of course, the total content of vanadium, sulfur and sodium present in the fuel. The high content of metal available in the dispersions of our invention are more than sufficient to economically overcome corrosion or slagging, in the manner well known in the art that would result from the presence of the normally occurring amounts of impurities in residual fuel oils. The following example illustrates a composition highly successful in overcoming slagging problems when Bunker C fuel oil is burned.

Example 5

The procedure of Example 1 was used in preparing the following fuel oil additive dispersion:

| | Percent by wt. |
|---|---|
| H sulfonate | 7.0 |
| L sulfonate | 5.0 |
| Hydrated alumina | 45.0 |
| Carbon black | 0.25 |
| Hydrocarbon oil | 27.75 |
| Water | 15.0 |

The dispersion viscosity at 80° F. was determined to be 60 Ford seconds and 3500 cps. (Brookfield viscometer). Centrifuge stability tests run as described in Example 1 gave excellent results.

A dispersion such as that hereinabove described may be used in concentrations of from about .02% to 0.2% by weight of the fuel oil, such as Bunker C fuel oil with excellent results.

While we have stressed the use of our dispersions as an additive material for heavy residual fuel oils, particularly Bunker C type fuel oil, they also possess utility as additives for other types of fuel oils and in a wide variety of other fields. Apart from their use as fuel oil additives for protection against corrosion and slagging, the advantages and characteristics of the metal oxide dispersions of our invention which have been pointed out make them particularly suitable for use in paint and ink formulations where stable dispersions of high metal oxide content is desirable.

What we claim as new and desire to protect by Letters Patent of the United States is:

1. A stable, free-flowing metal oxide dispersion in a water-in-oil emulsion medium comprising, based on the total weight of the dispersion:
   (A) About 25 to 50 percent of a member selected from the group consisting of hydrated alumina and zinc oxide;
   (B) About 8 to 18 percent total of (i) about 4 to 10 percent high molecular weight petroleum sulfonates having a molecular weight of between about 480 and 520 and (ii) from about 3 to 8 percent low molecular weight petroleum sulfonates having a molecular weight between about 400 and 440, wherein the ratio of petroleum sulfonates ranges from about 0.75 to 2.25 of said high molecular weight sulfonate to said low molecular weight sulfonate, and said sulfonates being selected from the group consisting of sodium, calcium, barium, magnesium and lithium sulfonates,
(C) About 8 to 18 percent of water; and
(D) About 14 to 59 percent of a hydrocarbon oil having a viscosity between about 30 and 150 S.U.S. at 100° F.

2. The stable dispersion as set forth in claim 1 wherein said total of petroleum sulfonates is between about 10 and 14 percent and wherein the ratio of petroleum sulfonates ranges from about 1.25 and 1.5 of said high molecular weight sulfonate to said low molecular weight sulfonate.

3. The stable dispersion as set forth in claim 1 wherein said water is between about 12 and 16 percent.

4. A stable, free flowing metal oxide dispersion comprising, based on the total weight of the dispersion:
(A) About 25 to 50 percent of a member selected from the group consisting of hydrated alumina and zinc oxide.
(B) About 10 to 14 percent total of (i) a high molecular weight sodium mahogany sulfonate having a molecular weight between about 490 and 510, and (ii) a low molecular weight sodium mahogany sulfonate having a molecular weight between about 410 and 430 wherein the weight ratio of said high molecular weight sulfonate to said low molecular weight sulfonates ranges between about 1.25 and 1.5,
(C) About 12 to 16 percent of water; and
(D) About 20 to 53 percent of hydrocarbon oil having a viscosity between about 30 and 150 S.U.S. at 100° F.

5. A stable, free-flowing, water-in-oil emulsion fuel oil additive comprising in the approximate percentages by weight:
(A) About 45 percent hydrated alumina;
(B) About 10–14 percent total of (i) a high molecular weight sodium mahogany sulfonate having a molecular weight between about 490 and 510, and (ii) a low molecular weight sodium mahogany sulfonate having a molecular weight between about 410 and 430 wherein the weight ratio of said high to low molecular weight sulfonates ranges between about 1.25 and 1.5;
(C) About 12 to 16 percent of water; and
(D) About 25 to 33 percent of hydrocarbon oil having a viscosity between about 30 and 150 S.U.S. at 100° F.

6. A method of preparing a stable, free-flowing metal oxide dispersion which comprises:
(A) Mixing about 4 to 10 parts by weight of a high molecular weight petroleum sulfonate having a molecular weight between about 480 and 520 with about 3 to 8 parts by weight of a low molecular weight petroleum sulfonate having a molecular weight between about 400 and 440 wherein the weight ratio of said high to low molecular weight sulfonates ranges between about 0.75 and 2.25, and said sulfonates being selected from the group consisting of sodium, calcium, barium, magnesium and lithium sulfonates, until a clear uniform blend is formed;
(B) Admixing about 20 to 53 parts by weight of a hydrocarbon oil having a viscosity between about 30 and 150 S.U.S. at 100° F. with about 8 to 18 parts by weight of said blend of sulfonates to form a clear solution;
(C) Incorporating into said clear sulfonate-oil solution about 25 to 50 parts by weight of a metal oxide selected from the group consisting of hydrated alumina and zinc oxide and mixing until a homogeneous dispersion is obtained; and
(D) Then vigorously admixing with said metal oxide dispersion about 8 to 18 parts by weight of water to form a water-in-oil emulsion.

7. A method of preparing a stable, free-flowing metal oxide dispersion which comprises:
(A) Mixing about 4 to 10 parts by weight of a high molecular weight petroleum sulfonate having a molecular weight of between about 480 and 520 with about 3 to 8 parts by weight of a low molecular weight petroleum sulfonate having a molecular weight between about 400 to 440 wherein the weight ratio of said high to low molecular weight sulfonates ranges between about 0.75 and 2.25, and said sulfonates being selected from the group consisting of sodium, calcium, barium, magnesium and lithium sulfonates, heating said mixture to about 150 to 180° F. and mixing until a clear uniform blend is obtained;
(B) Adding about 20 to 53 parts by weight of a hydrocarbon oil having a viscosity between about 30 and 150 S.U.S. at 100° F. to about 8 to 18 parts by weight of said sulfonate blend, heating to about 150° to 180° F. and mixing to form a clear solution;
(C) Incorporating into said hot clear sulfonate-oil-solution about 25 to 50 parts by weight of a metal oxide selected from the group consisting of hydrated alumina and zinc oxide and while maintaining a temperature of at least 100° F. mixing until a uniform dispersion is obtained; and
(D) Vigorously admixing with said warm dispersion about 8 to 18 parts by weight of water.

8. The method as set forth in claim 7 wherein said high molecular petroleum sulfonate is a sodium mahogany sulfonate having a molecular weight of between about 490 and 510, said low molecular weight petroleum sulfonate is a sodium mahogany sulfonate having a molecular weight of between about 410 and 430, and said weight ratio of high to low molecular weight sulfonates ranges between about 1.25 to 1.5.

9. The method as set forth in claim 7 wherein said hydrocarbon oil is admixed with about 10 to 14 parts by weight of said sulfonate blend.

10. The method as set forth in claim 9 wherein about 12 to 16 parts by weight of water are vigorously admixed with said warm dispersion.

References Cited

UNITED STATES PATENTS

| | | | |
|---|---|---|---|
| 2,469,377 | 5/1949 | Flett | 252—161 XR |
| 2,571,956 | 10/1951 | Showalter | 252—161 |
| 3,067,018 | 12/1962 | Voorhees | 44—51 |
| 3,078,662 | 2/1963 | Rocchini et al. | 44—68 |

FOREIGN PATENTS 761,378  11/1956  Great Britain.

DANIEL E. WYMAN, *Primary Examiner.*

W. J. SHINE, *Assistant Examiner.*